United States Patent
Meldolesi

(10) Patent No.: US 8,813,695 B2
(45) Date of Patent: Aug. 26, 2014

(54) SPLIT-CYCLE ENGINE WITH CROSSOVER PASSAGE COMBUSTION

(75) Inventor: Riccardo Meldolesi, Shoreham-by-Sea (GB)

(73) Assignee: Scuderi Group, LLC, West Springfield, MA (US)

(\*) Notice: Subject to any disclaimer, the term of this patent is extended or adjusted under 35 U.S.C. 154(b) by 496 days.

(21) Appl. No.: 13/160,533

(22) Filed: Jun. 15, 2011

(65) Prior Publication Data

US 2011/0308505 A1 Dec. 22, 2011

Related U.S. Application Data

(60) Provisional application No. 61/356,157, filed on Jun. 18, 2010.

(51) Int. Cl.
*F02B 33/22* (2006.01)
*F02B 41/06* (2006.01)
*F02B 19/02* (2006.01)
*F02B 19/18* (2006.01)

(52) U.S. Cl.
CPC .............. *F02B 33/22* (2013.01); *F02B 41/06* (2013.01); *F02B 19/02* (2013.01); *F02B 19/18* (2013.01)
USPC ......... 123/70 R; 123/68; 123/53.1; 123/52.5; 123/52.1

(58) Field of Classification Search
CPC .......... F02B 41/02; F02B 33/02; F02B 33/22; F02B 41/06; F02B 1/00; F01L 2001/34446
USPC ............ 123/52.1–52.2, 52.5, 53.1, 68, 70 R; 60/597

See application file for complete search history.

(56) References Cited

U.S. PATENT DOCUMENTS

| | | | |
|---|---|---|---|
| 1,936,653 | A | 11/1933 | Almen |
| 2,109,809 | A | 3/1938 | Van Ranst |
| 2,394,354 | A | 2/1946 | Barr |

(Continued)

FOREIGN PATENT DOCUMENTS

| | | |
|---|---|---|
| DE | 10115967 A1 | 10/2002 |
| GB | 2250801 A | 6/1992 |

(Continued)

OTHER PUBLICATIONS

Meldolesi, et al. (Southwest Research Institute), Scuderi Split Cycle Fast Acting Valvetrain: Architecture and Development, SAE paper 2011-01-0404 (Jan. 18, 2011) (23 pages).

(Continued)

*Primary Examiner* — Lindsay Low
*Assistant Examiner* — Kevin Lathers
(74) *Attorney, Agent, or Firm* — Nutter McClennen & Fish LLP; John J. Penny, Jr.; Michael P. Visconti, III

(57) ABSTRACT

Methods, systems, and devices are disclosed that generally involve split-cycle engines in which a combustion event is initiated in a crossover passage that interconnects a compression cylinder and an expansion cylinder of the split-cycle engine. In one embodiment, the compression piston leads the expansion piston by a phase shift angle so that, for example, a substantial amount of the combustion event can occur in the crossover passage at a constant volume.

17 Claims, 10 Drawing Sheets

(56) References Cited

U.S. PATENT DOCUMENTS

| | | |
|---|---|---|
| 2,772,667 A | 12/1956 | Nallinger |
| 3,209,737 A | 10/1965 | Isao |
| 3,774,581 A | 11/1973 | Lundy |
| 3,786,792 A | 1/1974 | Pelizzoni et al. |
| 3,808,818 A | 5/1974 | Cataldo |
| 3,880,126 A * | 4/1975 | Thurston et al. ............ 123/70 R |
| 3,908,701 A | 9/1975 | Dawawala |
| 3,938,483 A | 2/1976 | Firey |
| 3,949,964 A | 4/1976 | Freeman |
| 4,133,172 A | 1/1979 | Cataldo |
| 4,224,798 A | 9/1980 | Brinkerhoff |
| 4,418,657 A | 12/1983 | Wishart |
| 4,825,717 A | 5/1989 | Mills |
| 4,860,716 A | 8/1989 | Deutschmann |
| 4,934,652 A | 6/1990 | Golden |
| 5,018,487 A | 5/1991 | Shinkai |
| 5,193,495 A | 3/1993 | Wood, III |
| 5,402,756 A | 4/1995 | Bohme et al. |
| 5,555,861 A | 9/1996 | Mayr et al. |
| 5,690,066 A | 11/1997 | Hampton et al. |
| 5,713,316 A | 2/1998 | Sturman |
| 5,964,087 A | 10/1999 | Tort-Oropeza |
| 5,988,124 A | 11/1999 | Duesmann |
| 6,152,714 A | 11/2000 | Mitsuya et al. |
| 6,192,841 B1 | 2/2001 | Vorih et al. |
| 6,230,472 B1 | 5/2001 | Stahlecker |
| 6,230,742 B1 | 5/2001 | Bircann |
| 6,273,057 B1 | 8/2001 | Schwoerer et al. |
| 6,302,370 B1 | 10/2001 | Schwoerer et al. |
| 6,332,917 B1 | 12/2001 | Schollkopf |
| 6,397,579 B1 * | 6/2002 | Negre ............................ 60/39.6 |
| 6,412,457 B1 | 7/2002 | Vorih et al. |
| 6,474,277 B1 | 11/2002 | Vanderpoel et al. |
| 6,510,824 B2 | 1/2003 | Vorih et al. |
| 6,543,225 B2 | 4/2003 | Scuderi |
| 6,584,885 B2 | 7/2003 | Lou |
| 6,609,371 B2 | 8/2003 | Scuderi |
| 6,647,954 B2 | 11/2003 | Yang et al. |
| 6,655,327 B1 | 12/2003 | Hedman |
| 6,874,453 B2 | 4/2005 | Coney et al. |
| 6,883,775 B2 | 4/2005 | Coney et al. |
| 6,952,923 B2 | 10/2005 | Branyon et al. |
| 7,140,332 B2 | 11/2006 | Klein et al. |
| 7,156,062 B2 | 1/2007 | Vanderpoel |
| 7,171,930 B2 | 2/2007 | Keel |
| 7,353,786 B2 * | 4/2008 | Scuderi et al. .................. 123/68 |
| 7,481,190 B2 | 1/2009 | Scuderi |
| 7,513,224 B2 | 4/2009 | Heaton |
| 7,536,984 B2 | 5/2009 | Lou |
| 7,603,970 B2 | 10/2009 | Scuderi et al. |
| 7,628,126 B2 | 12/2009 | Scuderi |
| 7,637,234 B2 | 12/2009 | Tussing et al. |
| 7,690,337 B2 | 4/2010 | Pirault et al. |
| 7,810,459 B2 | 10/2010 | Branyon et al. |
| 7,823,547 B2 | 11/2010 | Forner, Sr. et al. |
| 7,963,259 B2 | 6/2011 | Meldolesi et al. |
| 2002/0185091 A1 | 12/2002 | Vorih et al. |
| 2005/0022768 A1 | 2/2005 | Tores et al. |
| 2005/0132987 A1 | 6/2005 | Chang |
| 2005/0268609 A1 | 12/2005 | Branyon et al. |
| 2006/0273271 A1 | 12/2006 | Yang et al. |
| 2007/0157894 A1 | 7/2007 | Scuderi et al. |
| 2008/0054205 A1 | 3/2008 | Lou |
| 2008/0202454 A1 | 8/2008 | Pirault |
| 2008/0251041 A1 | 10/2008 | Lou |
| 2009/0038596 A1 | 2/2009 | Pirault et al. |
| 2009/0038598 A1 | 2/2009 | Phillips |
| 2009/0044778 A1 | 2/2009 | Scuderi et al. |
| 2009/0133648 A1 | 5/2009 | Lou |
| 2010/0126442 A1 | 5/2010 | Lou |
| 2010/0180847 A1 | 7/2010 | Meldolesi et al. |
| 2010/0180848 A1 | 7/2010 | Meldolesi et al. |
| 2010/0263646 A1 | 10/2010 | Giannini et al. |
| 2010/0282225 A1 | 11/2010 | Gilbert et al. |
| 2010/0300385 A1 | 12/2010 | Durrett et al. |

FOREIGN PATENT DOCUMENTS

| | | |
|---|---|---|
| GB | 2340881 A | 3/2000 |
| JP | 40-010860 | 4/1965 |
| JP | 10-274105 A | 10/1998 |
| JP | 2004-293695 A | 10/2004 |
| WO | 2006094213 A1 | 9/2006 |

OTHER PUBLICATIONS

Phillips, et al. (Southwest Research Institute), Scuderi Split Cycle Research Engine: Overview, Architecture and Operation, SAE paper 2011-01-0403 (Jan. 18, 2011) (21 pages).

Urata, et al. (Honda), A Study of Vehicle Equipped with Non-Throttling S.I. Engine with Early Intake Valve Closing Mechanism, SAE paper 930820 (Mar. 1, 1993) (13 pages).

International Search Report and Written Opinion, PCT Application No. PCT/US11/40437, dated Oct. 18, 2011.

* cited by examiner

SPLIT-CYCLE ENGINE WITH CROSSOVER PASSAGE COMBUSTION

CROSS-REFERENCE TO RELATED APPLICATIONS

This application claims the benefit of priority of U.S. Provisional Patent Application No. 61/356,157, filed on Jun. 18, 2010, the entire contents of which are incorporated herein by reference.

FIELD

The present invention relates to internal combustion engines. More particularly, the invention relates to split-cycle engines with crossover passage combustion.

BACKGROUND

For purposes of clarity, the term "conventional engine" as used in the present application refers to an internal combustion engine wherein all four strokes of the well-known Otto cycle (the intake, compression, expansion and exhaust strokes) are contained in each piston/cylinder combination of the engine. Each stroke requires one half revolution of the crankshaft (180 degrees crank angle ("CA")), and two full revolutions of the crankshaft (720 degrees CA) are required to complete the entire Otto cycle in each cylinder of a conventional engine.

Also, for purposes of clarity, the following definition is offered for the term "split-cycle engine" as may be applied to engines disclosed in the prior art and as referred to in the present application.

A split-cycle engine generally comprises:

a crankshaft rotatable about a crankshaft axis;

a compression piston slidably received within a compression cylinder and operatively connected to the crankshaft such that the compression piston reciprocates through an intake stroke and a compression stroke during a single rotation of the crankshaft;

an expansion (power) piston slidably received within an expansion cylinder and operatively connected to the crankshaft such that the expansion piston reciprocates through an expansion stroke and an exhaust stroke during a single rotation of the crankshaft; and a crossover passage interconnecting the compression and expansion cylinders, the crossover passage including at least a crossover expansion (XovrE) valve disposed therein, but more preferably including a crossover compression (XovrC) valve and a crossover expansion (XovrE) valve defining a pressure chamber therebetween.

A split-cycle air hybrid engine combines a split-cycle engine with an air reservoir (also commonly referred to as an air tank) and various controls. This combination enables the engine to store energy in the form of compressed air in the air reservoir. The compressed air in the air reservoir is later used in the expansion cylinder to power the crankshaft. In general, a split-cycle air hybrid engine as referred to herein comprises:

a crankshaft rotatable about a crankshaft axis;

a compression piston slidably received within a compression cylinder and operatively connected to the crankshaft such that the compression piston reciprocates through an intake stroke and a compression stroke during a single rotation of the crankshaft;

an expansion (power) piston slidably received within an expansion cylinder and operatively connected to the crankshaft such that the expansion piston reciprocates through an expansion stroke and an exhaust stroke during a single rotation of the crankshaft;

a crossover passage (port) interconnecting the compression and expansion cylinders, the crossover passage including at least a crossover expansion (XovrE) valve disposed therein, but more preferably including a crossover compression (XovrC) valve and a crossover expansion (XovrE) valve defining a pressure chamber therebetween; and an air reservoir operatively connected to the crossover passage and selectively operable to store compressed air from the compression cylinder and to deliver compressed air to the expansion cylinder.

FIG. 1 illustrates one exemplary embodiment of a prior art split-cycle air hybrid engine. The split-cycle engine 100 replaces two adjacent cylinders of a conventional engine with a combination of one compression cylinder 102 and one expansion cylinder 104. The compression cylinder 102 and the expansion cylinder 104 are formed in an engine block in which a crankshaft 106 is rotatably mounted. Upper ends of the cylinders 102, 104 are closed by a cylinder head 130. The crankshaft 106 includes axially displaced and angularly offset first and second crank throws 126, 128, having a phase angle therebetween. The first crank throw 126 is pivotally joined by a first connecting rod 138 to a compression piston 110 and the second crank throw 128 is pivotally joined by a second connecting rod 140 to an expansion piston 120 to reciprocate the pistons 110, 120 in their respective cylinders 102, 104 in a timed relation determined by the angular offset of the crank throws and the geometric relationships of the cylinders, crank, and pistons. Alternative mechanisms for relating the motion and timing of the pistons can be utilized if desired. The rotational direction of the crankshaft and the relative motions of the pistons near their bottom dead center (BDC) positions are indicated by the arrows associated in the drawings with their corresponding components.

The four strokes of the Otto cycle are thus "split" over the two cylinders 102 and 104 such that the compression cylinder 102 contains the intake and compression strokes and the expansion cylinder 104 contains the expansion and exhaust strokes. The Otto cycle is therefore completed in these two cylinders 102, 104 once per crankshaft 106 revolution (360 degrees CA).

During the intake stroke, intake air is drawn into the compression cylinder 102 through an inwardly-opening (opening inward into the cylinder and toward the piston) poppet intake valve 108. During the compression stroke, the compression piston 110 pressurizes the air charge and drives the air charge through a crossover passage 112, which acts as the intake passage for the expansion cylinder 104. The engine 100 can have one or more crossover passages 112.

The volumetric (or geometric) compression ratio of the compression cylinder 102 of the split-cycle engine 100 (and for split-cycle engines in general) is herein referred to as the "compression ratio" of the split-cycle engine. The volumetric (or geometric) compression ratio of the expansion cylinder 104 of the engine 100 (and for split-cycle engines in general) is herein referred to as the "expansion ratio" of the split-cycle engine. The volumetric compression ratio of a cylinder is well known in the art as the ratio of the enclosed (or trapped) volume in the cylinder (including all recesses) when a piston reciprocating therein is at its BDC position to the enclosed volume (i.e., clearance volume) in the cylinder when said piston is at its top dead center (TDC) position. Specifically for split-cycle engines as defined herein, the compression ratio of a compression cylinder is determined when the XovrC valve is closed. Also specifically for split-cycle engines as defined herein, the expansion ratio of an expansion cylinder is determined when the XovrE valve is closed.

Due to very high volumetric compression ratios (e.g., 20 to 1, 30 to 1, 40 to 1, or greater) within the compression cylinder 102, an outwardly-opening (opening outwardly away from the cylinder and piston) poppet crossover compression (XovrC) valve 114 at the inlet of the crossover passage 112 is used to control flow from the compression cylinder 102 into the crossover passage 112. Due to very high volumetric compression ratios (e.g., 20 to 1, 30 to 1, 40 to 1, or greater) within the expansion cylinder 104, an outwardly-opening poppet crossover expansion (XovrE) valve 116 at the outlet of the crossover passage 112 controls flow from the crossover passage 112 into the expansion cylinder 104. The actuation rates and phasing of the XovrC and XovrE valves 114, 116 are timed to maintain pressure in the crossover passage 112 at a high minimum pressure (typically 20 bar or higher at full load) during all four strokes of the Otto cycle.

At least one fuel injector 118 injects fuel into the pressurized air at the exit end of the crossover passage 112 in coordination with the XovrE valve 116 opening. Alternatively, or in addition, fuel can be injected directly into the expansion cylinder 104. The fuel-air charge fully enters the expansion cylinder 104 shortly after the expansion piston 120 reaches its TDC position. As the piston 120 begins its descent from its TDC position, and while the XovrE valve 116 is still open, one or more spark plugs 122 are fired to initiate combustion (typically between 10 to 20 degrees CA after TDC of the expansion piston 120). Combustion can be initiated while the expansion piston is between 1 and 30 degrees CA past its TDC position. More preferably, combustion can be initiated while the expansion piston is between 5 and 25 degrees CA past its TDC position. Most preferably, combustion can be initiated while the expansion piston is between 10 and 20 degrees CA past its TDC position. Additionally, combustion can be initiated through other ignition devices and/or methods, such as with glow plugs, microwave ignition devices, or through compression ignition methods.

The XovrE valve 116 is then closed before the resulting combustion event enters the crossover passage 112. The combustion event drives the expansion piston 120 downward in a power stroke. Exhaust gases are pumped out of the expansion cylinder 104 through an inwardly-opening poppet exhaust valve 124 during the exhaust stroke.

With the split-cycle engine concept, the geometric engine parameters (i.e., bore, stroke, connecting rod length, compression ratio, etc.) of the compression and expansion cylinders are generally independent from one another. For example, the crank throws 126, 128 for the compression cylinder 102 and expansion cylinder 104, respectively, have different radii and are phased apart from one another with TDC of the expansion piston 120 occurring prior to TDC of the compression piston 110. This independence enables the split-cycle engine to potentially achieve higher efficiency levels and greater torques than typical four-stroke engines.

The geometric independence of engine parameters in the split-cycle engine 100 is also one of the main reasons why pressure can be maintained in the crossover passage 112 as discussed earlier. Specifically, the expansion piston 120 reaches its TDC position prior to the compression piston 110 reaching its TDC position by a discrete phase angle (typically between 10 and 30 crank angle degrees). This phase angle, together with proper timing of the XovrC valve 114 and the XovrE valve 116, enables the split-cycle engine 100 to maintain pressure in the crossover passage 112 at a high minimum pressure (typically 20 bar absolute or higher during full load operation) during all four strokes of its pressure/volume cycle. That is, the split-cycle engine 100 is operable to time the XovrC valve 114 and the XovrE valve 116 such that the XovrC and XovrE valves 114, 116 are both open for a substantial period of time (or period of crankshaft rotation) during which the expansion piston 120 descends from its TDC position towards its BDC position and the compression piston 110 simultaneously ascends from its BDC position towards its TDC position. During the period of time (or crankshaft rotation) that the crossover valves 114, 116 are both open, a substantially equal mass of gas is transferred (1) from the compression cylinder 102 into the crossover passage 112 and (2) from the crossover passage 112 to the expansion cylinder 104. Accordingly, during this period, the pressure in the crossover passage is prevented from dropping below a predetermined minimum pressure (typically 20, 30, or 40 bar absolute during full load operation). Moreover, during a substantial portion of the intake and exhaust strokes (typically 90% of the entire intake and exhaust strokes or greater), the XovrC valve 114 and XovrE valve 116 are both closed to maintain the mass of trapped gas in the crossover passage 112 at a substantially constant level. As a result, the pressure in the crossover passage 112 is maintained at a predetermined minimum pressure during all four strokes of the engine's pressure/volume cycle.

For purposes herein, the method of opening the XovrC 114 and XovrE 116 valves while the expansion piston 120 is descending from TDC and the compression piston 110 is ascending toward TDC in order to simultaneously transfer a substantially equal mass of gas into and out of the crossover passage 112 is referred to as the "push-pull" method of gas transfer. It is the push-pull method that enables the pressure in the crossover passage 112 of the engine 100 to be maintained at typically 20 bar or higher during all four strokes of the engine's cycle when the engine is operating at full load.

The crossover valves 114, 116 are actuated by a valve train that includes one or more cams (not shown). In general, a cam-driven mechanism includes a camshaft mechanically linked to the crankshaft. One or more cams are mounted to the camshaft, each having a contoured surface that controls the valve lift profile of the valve event (i.e., the event that occurs during a valve actuation). The XovrC valve 114 and the XovrE valve 116 each can have its own respective cam and/or its own respective camshaft. As the XovrC and XovrE cams rotate, eccentric portions thereof impart motion to a rocker arm, which in turn imparts motion to the valve, thereby lifting (opening) the valve off of its valve seat. As the cam continues to rotate, the eccentric portion passes the rocker arm and the valve is allowed to close.

For purposes herein, a valve event (or valve opening event) is defined as the valve lift from its initial opening off of its valve seat to its closing back onto its valve seat versus rotation of the crankshaft during which the valve lift occurs. Also, for purposes herein, the valve event rate (i.e., the valve actuation rate) is the duration in time required for the valve event to occur within a given engine cycle. It is important to note that a valve event is generally only a fraction of the total duration of an engine operating cycle (e.g., 720 degrees CA for a conventional engine cycle and 360 degrees CA for a split-cycle engine).

The split-cycle air hybrid engine 100 also includes an air reservoir (tank) 142, which is operatively connected to the crossover passage 112 by an air reservoir tank valve 152. Embodiments with two or more crossover passages 112 may include a tank valve 152 for each crossover passage 112, which connect to a common air reservoir 142, or alternatively each crossover passage 112 may operatively connect to separate air reservoirs 142.

The tank valve 152 is typically disposed in an air tank port 154, which extends from the crossover passage 112 to the air tank 142. The air tank port 154 is divided into a first air tank port section 156 and a second air tank port section 158. The first air tank port section 156 connects the air tank valve 152 to the crossover passage 112, and the second air tank port section 158 connects the air tank valve 152 to the air tank 142. The volume of the first air tank port section 156 includes the volume of all additional recesses which connect the tank valve 152 to the crossover passage 112 when the tank valve 152 is closed. Preferably, the volume of the first air tank port section 156 is small relative to the second air tank port section 158. More preferably, the first air tank port section 156 is substantially non-existent, that is, the tank valve 152 is most preferably disposed such that it is flush against the outer wall of the crossover passage 112.

The tank valve 152 may be any suitable valve device or system. For example, the tank valve 152 may be a pressure activated check valve, or an active valve which is activated by various valve actuation devices (e.g., pneumatic, hydraulic, cam, electric, or the like). Additionally, the tank valve 152 may comprise a tank valve system with two or more valves actuated with two or more actuation devices.

The air tank 142 is utilized to store energy in the form of compressed air and to later use that compressed air to power the crankshaft 106. This mechanical means for storing potential energy provides numerous potential advantages over the current state of the art. For instance, the split-cycle air hybrid engine 100 can potentially provide many advantages in fuel efficiency gains and NOx emissions reduction at relatively low manufacturing and waste disposal costs in relation to other technologies on the market, such as diesel engines and electric-hybrid systems.

The engine 100 typically runs in a normal operating or firing (NF) mode (also commonly called the engine firing (EF) mode) and one or more of four basic air hybrid modes. In the EF mode, the engine 100 functions normally as previously described in detail herein, operating without the use of the air tank 142. In the EF mode, the air tank valve 152 remains closed to isolate the air tank 142 from the basic split-cycle engine. In the four air hybrid modes, the engine 100 operates with the use of the air tank 142.

The four basic air hybrid modes include:

1) Air Expander (AE) mode, which includes using compressed air energy from the air tank 142 without combustion;

2) Air Compressor (AC) mode, which includes storing compressed air energy into the air tank 142 without combustion;

3) Air Expander and Firing (AEF) mode, which includes using compressed air energy from the air tank 142 with combustion; and 4) Firing and Charging (FC) mode, which includes storing compressed air energy into the air tank 142 with combustion.

Further details on split-cycle engines can be found in U.S. Pat. No. 6,543,225 entitled Split Four Stroke Cycle Internal Combustion Engine and issued on Apr. 8, 2003; and U.S. Pat. No. 6,952,923 entitled Split-Cycle Four-Stroke Engine and issued on Oct. 11, 2005, each of which is incorporated by reference herein in its entirety.

Further details on air hybrid engines are disclosed in U.S. Pat. No. 7,353,786 entitled Split-Cycle Air Hybrid Engine and issued on Apr. 8, 2008; U.S. Patent Application No. 61/365,343 entitled Split-Cycle Air Hybrid Engine and filed on Jul. 18, 2010; and U.S. Patent Application No. 61/313,831 entitled Split-Cycle Air Hybrid Engine and filed on Mar. 15, 2010, each of which is incorporated by reference herein in its entirety.

Direct fuel injection has various advantages which are well known in the art. Direct fuel injection in gasoline engines enables increased fuel efficiency and reduced emission levels at low loads. Diesel engines, which are typically more fuel efficient than gasoline engines, usually require direct fuel injection.

The high expansion ratio in the expansion cylinder 104, however, can make it difficult for split-cycle engines of the type shown in FIG. 1 to utilize direct fuel injection into the expansion cylinder 104. For one thing, the very small clearance distance (e.g., 1.0, 0.9, 0.8, 0.7 millimeter(s), or less) between the cylinder head 130 and the expansion piston 120 when the expansion piston 120 is at TDC makes packaging injectors into the expansion cylinder 104 difficult to accomplish. In addition, direct fuel injection into the small space available in the expansion cylinder 104 can lead to wetting of the cylinder walls, which is detrimental to engine efficiency.

In addition, the expansion stroke in prior art split-cycle engines of the type shown in FIG. 1 is a variable-volume combustion process. As a result, very rapid combustion is required in order for the flame front to apply pressure to the expansion piston 120, since it is descending away from the flame front towards its BDC position when combustion occurs. Such rapid combustion is typically accomplished in the engine of FIG. 1 by utilizing very high pressures in the crossover passage, which in turn causes the air/fuel mixture entering the expansion cylinder 104 to flow in at very rapid flow rates, in some cases reaching the speed of sound (i.e., sonic flow). This phenomenon creates substantial turbulence in the expansion cylinder 104 prior to and during the combustion event initiated by the spark plug 122, which leads to rapid combustion of the air/fuel mixture.

There remains a need, however, for other techniques for achieving rapid combustion, particularly in diesel engines in which high crossover passage pressures can lead to undesirable pre-combustion of the fuel. As set out below, a combustion process that takes place at a constant-volume or that is at least initiated under constant-volume conditions can provide an alternative means of rapidly increasing the temperature and pressure of an air/fuel mixture.

SUMMARY

The methods, systems, and devices disclosed herein generally involve initiating and/or performing combustion within the crossover passage of a split-cycle engine. This can advantageously permit substantially constant-volume combustion and can facilitate direct injection of fuel into the combustion chamber.

In one aspect of at least one embodiment of the invention, an engine is provided that includes a crankshaft rotatable about a crankshaft axis and a compression piston slidably received within a compression cylinder and operatively connected to the crankshaft such that the compression piston is operable to reciprocate through an intake stroke and a compression stroke of a four stroke cycle during a single rotation of the crankshaft. The engine also includes an expansion piston slidably received within an expansion cylinder and operatively connected to the crankshaft such that the expansion piston is operable to reciprocate through an expansion stroke and an exhaust stroke of said four stroke cycle during a single rotation of the crankshaft. The engine further includes a crossover passage interconnecting the compression cylinder and the expansion cylinder, a crossover compression valve operable to control fluid communication between the compression cylinder and the crossover passage, and a crossover expansion valve operable to control fluid communication between the crossover passage and the expansion cylinder. The engine is operable to initiate a combustion event in the crossover passage. A phase shift angle, defined as the number of degrees the crankshaft must rotate after the compression piston reaches its top dead center position in order for the expansion piston to reach its top dead center position, is greater than approximately 5 degrees and less than approximately 90 degrees.

Related aspects of the invention provide an engine, e.g., as described above, in which the phase shift angle is greater than approximately 5 degrees and less than approximately 60 degrees.

Related aspects of the invention provide an engine, e.g., as described above, in which the phase shift angle is greater than approximately 10 degrees and less than approximately 35 degrees.

Related aspects of the invention provide an engine, e.g., as described above, in which a ratio of a volume in the expansion cylinder when the expansion piston is at its bottom dead center position to a volume in the expansion cylinder when the expansion piston is at its top dead center position is approximately 40 to 1 or greater.

Related aspects of the invention provide an engine, e.g., as described above, in which a ratio of a volume in the compression cylinder when the compression piston is at its bottom dead center position to a volume in the compression cylinder when the compression piston is at its top dead center position is approximately 40 to 1 or greater.

Related aspects of the invention provide an engine, e.g., as described above, in which the crossover compression valve is operable to open outwardly away from an interior of the compression cylinder.

Related aspects of the invention provide an engine, e.g., as described above, in which the crossover expansion valve is operable to open outwardly away from an interior of the expansion cylinder.

Related aspects of the invention provide an engine, e.g., as described above, in which the engine is operable to initiate said combustion event while the expansion piston is ascending from its bottom dead center position towards its top dead center position.

Related aspects of the invention provide an engine, e.g., as described above, in which the engine is operable to initiate said combustion event while the expansion piston is descending from its top dead center position towards its bottom dead center position.

Related aspects of the invention provide an engine, e.g., as described above, in which the engine is operable to initiate said combustion event while the compression piston is descending from its top dead center position towards its bottom dead center position.

Related aspects of the invention provide an engine, e.g., as described above, in which the engine is operable to open the crossover expansion valve while the expansion piston is within ±10 degrees of rotation of the crankshaft from its top dead center position.

Related aspects of the invention provide an engine, e.g., as described above, that includes a fuel injection system operable to add fuel to the crossover passage.

Related aspects of the invention provide an engine, e.g., as described above, in which the engine is operable to initiate said combustion event via compression ignition.

Related aspects of the invention provide an engine, e.g., as described above, that includes a spark plug at least partially disposed in the crossover passage and operable to initiate said combustion event.

Related aspects of the invention provide an engine, e.g., as described above, that includes an air tank operatively coupled to the crossover passage and a tank valve configured to selectively place the air tank in fluid communication with the crossover passage.

Related aspects of the invention provide an engine, e.g., as described above, in which the engine is operable to initiate the combustion event while the crossover compression valve and the crossover expansion valve are closed.

In another aspect of at least one embodiment of the invention, a method of operating an engine is provided that includes supplying air compressed by a compression piston to a crossover passage and, after said supplying, transitioning the crossover passage to a closed, constant-volume configuration. The method also includes, after said transitioning, adding fuel to the crossover passage and initiating combustion of an air-fuel mixture disposed within the crossover passage. The method further includes, after said initiating, transferring pressure generated during combustion to an expansion cylinder to exert force on an expansion piston, the expansion piston driving a crankshaft. The initiating is performed after the compression piston reaches top dead center and before the expansion piston reaches top dead center.

Related aspects of the invention provide a method, e.g., as described above, in which said transitioning comprises closing a crossover compression valve and closing a crossover expansion valve.

Related aspects of the invention provide a method, e.g., as described above, in which said transitioning comprises closing an air tank valve.

Related aspects of the invention provide a method, e.g., as described above, in which said supplying comprises transferring the air compressed by the compression piston from an air tank to the crossover passage.

Related aspects of the invention provide a method, e.g., as described above, in which the pressure generated during combustion is transferred to the expansion cylinder before combustion is completed.

In another aspect of at least one embodiment of the invention, a method of operating an engine is provided that includes supplying air compressed by a compression piston to a crossover passage and, after said supplying, transitioning the crossover passage to a closed, constant-volume configuration. The method also includes, after said transitioning, adding fuel to the crossover passage and initiating combustion of an air-fuel mixture disposed within the crossover passage. The method further includes, after said initiating, transferring pressure generated during combustion to an expansion cylinder to exert force on an expansion piston, the expansion piston driving a crankshaft. The initiating is performed after the compression piston reaches top dead center and after the expansion piston reaches top dead center.

The present invention further provides devices, systems, and methods as claimed.

BRIEF DESCRIPTION OF THE DRAWINGS

The invention will be more fully understood from the following detailed description taken in conjunction with the accompanying drawings, in which.

DETAILED DESCRIPTION

Figure 1:
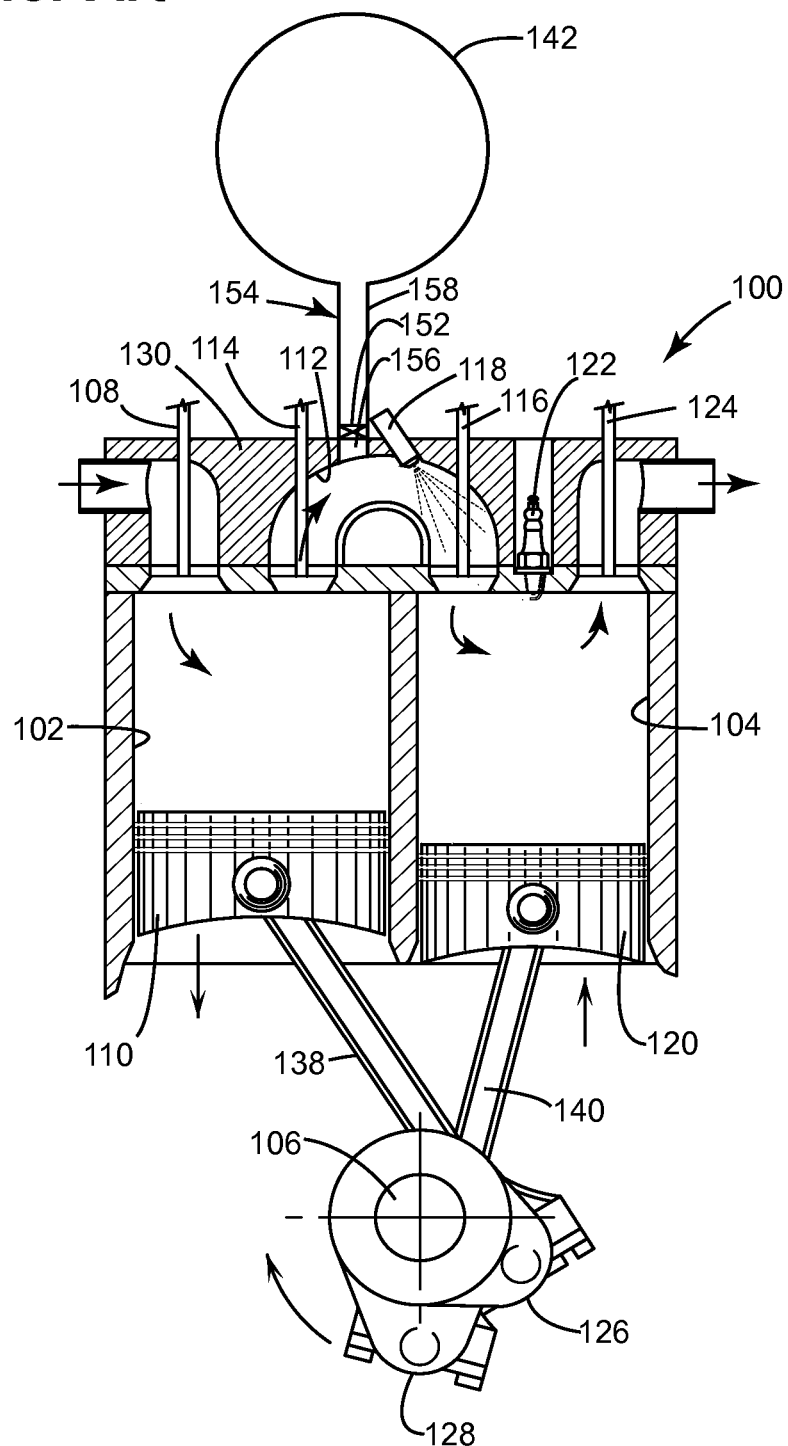
FIG. 1 is a schematic diagram of a prior art split-cycle air hybrid engine.

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The term "air" is used herein to refer both to air and mixtures of air and other substances such as fuel or exhaust products. The term "fluid" is used herein to refer to both liquids and gasses. Features shown in a particular figure that are the same as, or similar to, features shown in another figure are designated by like reference numerals.

Referring to FIGS. 2-9, an exemplary embodiment of a four stroke internal combustion engine 50 in accordance with the present invention is shown passing through its four strokes.

The split-cycle engine 50 includes a compression cylinder 66 with a compression piston 72 reciprocating therein. The split-cycle engine 50 further includes an expansion cylinder 68 with an expansion piston 74 reciprocating therein. A crossover passage 55 interconnects the compression cylinder 66 and the expansion cylinder 68. The compression piston 72 is connected to a crankshaft 52 via a first crank throw 58. The expansion piston 74 is similarly connected to the same crankshaft 52 via a second crank throw 56. The crankshaft 52 is rotatable about a crankshaft axis 54. A cylinder head 70 is disposed over an open end of the compression cylinder 66 and the expansion cylinder 68 to cover and seal the cylinders.

Figure 2:
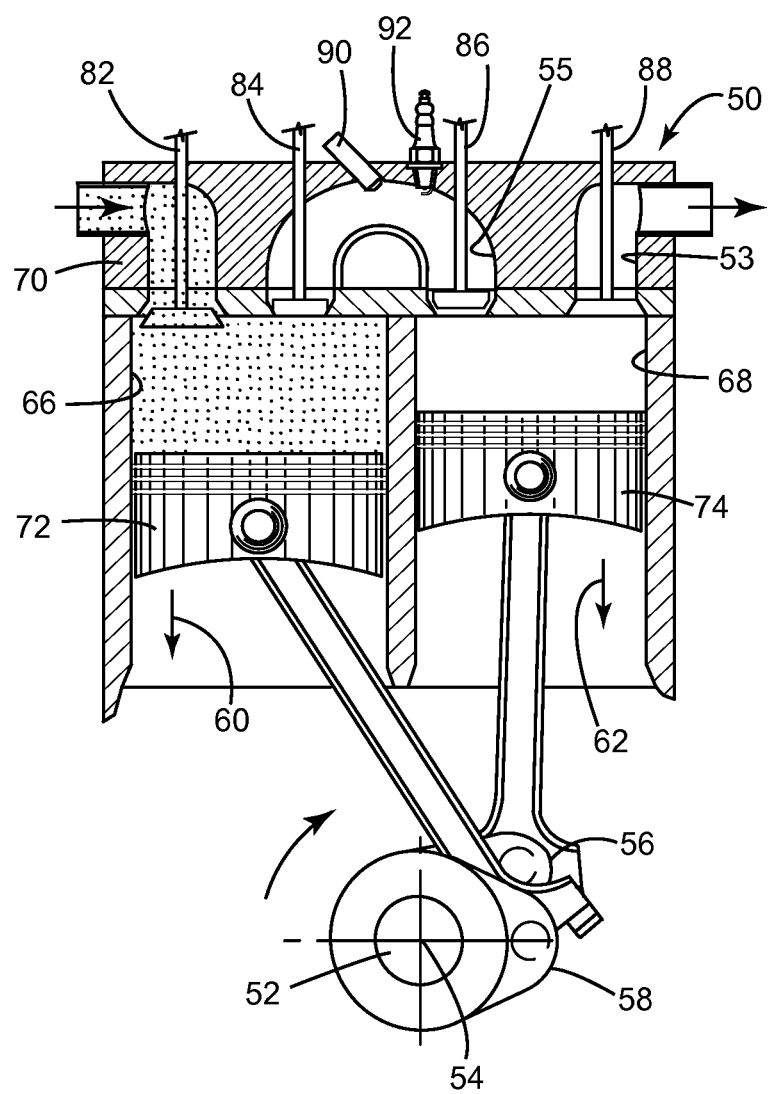
FIG. 2 is a schematic diagram of an exemplary embodiment of a split-cycle four stroke internal combustion engine in accordance with the present invention during the intake stroke.

Referring to FIG. 2, at substantially the beginning of an intake stroke (represented by arrow 60), an inwardly-opening intake valve 82 opens into the compression cylinder 66. The compression piston 72 descends within the compression cylinder 66, which draws outside air into the compression cylinder.

Figure 3:
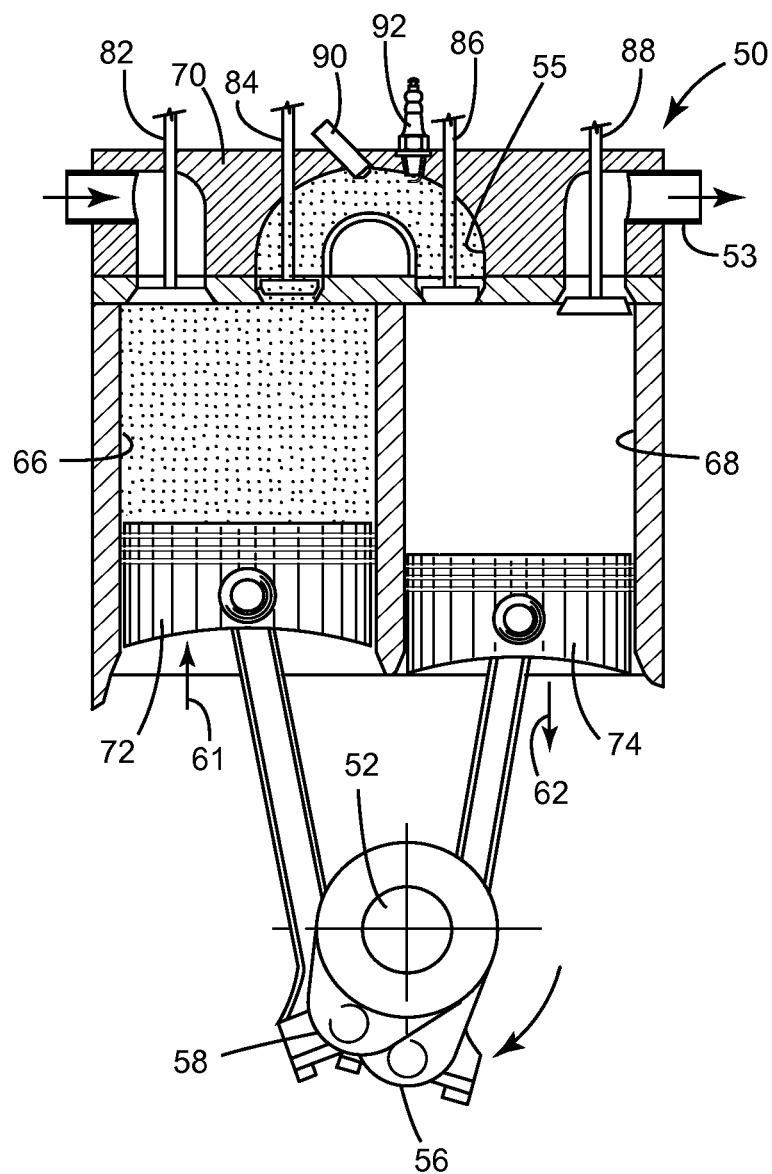
FIG. 3 is a schematic diagram of the split-cycle engine of FIG. 2 during partial compression of the compression stroke.

Referring to FIG. 3, the intake valve 82 closes when the compression piston 72 is substantially at its BDC position and beginning its compression stroke (represented by arrow 61). At substantially the same time or shortly thereafter, an outwardly-opening crossover compression valve 84 opens. An outwardly-opening crossover expansion valve 86 remains closed at this time such that, as the compression piston 72 ascends in the compression stroke, it compresses air into the crossover passage 55.

Figure 4:
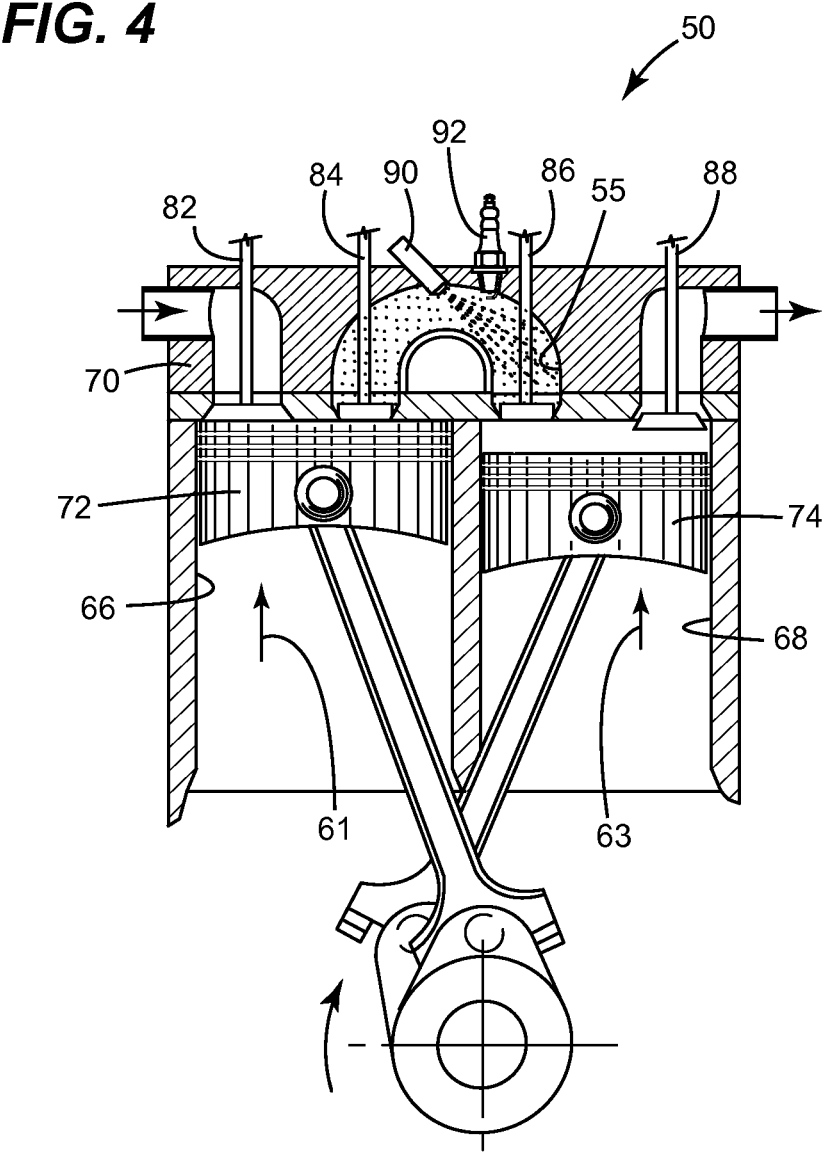
FIG. 4 is a schematic diagram of the split-cycle engine of FIG. 2 after the compression stroke and during the beginning of fuel injection into the crossover passage.

Referring to FIG. 4, the outwardly-opening crossover compression valve 84 closes at approximately the end of the compression stroke 61 when the compression piston 72 is substantially at its TDC position. At about the same time or shortly thereafter, a fuel injector 90 begins to inject fuel (e.g., diesel, gasoline, ethanol, etc.) into the crossover passage 55. The crossover expansion valve 86 remains closed at this time, such that the crossover passage 55 is in a closed, constant-volume configuration as fuel is added. The engine 50 utilizes very high compression ratios (e.g., 40 to 1, 80 to 1, or greater). This means that, at TDC, the compression piston 72 comes very close to the cylinder head 70 (e.g., 1.0, 0.9, 0.8, 0.7 millimeters, or less). The high compression ratio enables the engine 50 to pump as much air as possible into the crossover passage 55.

Figure 5:
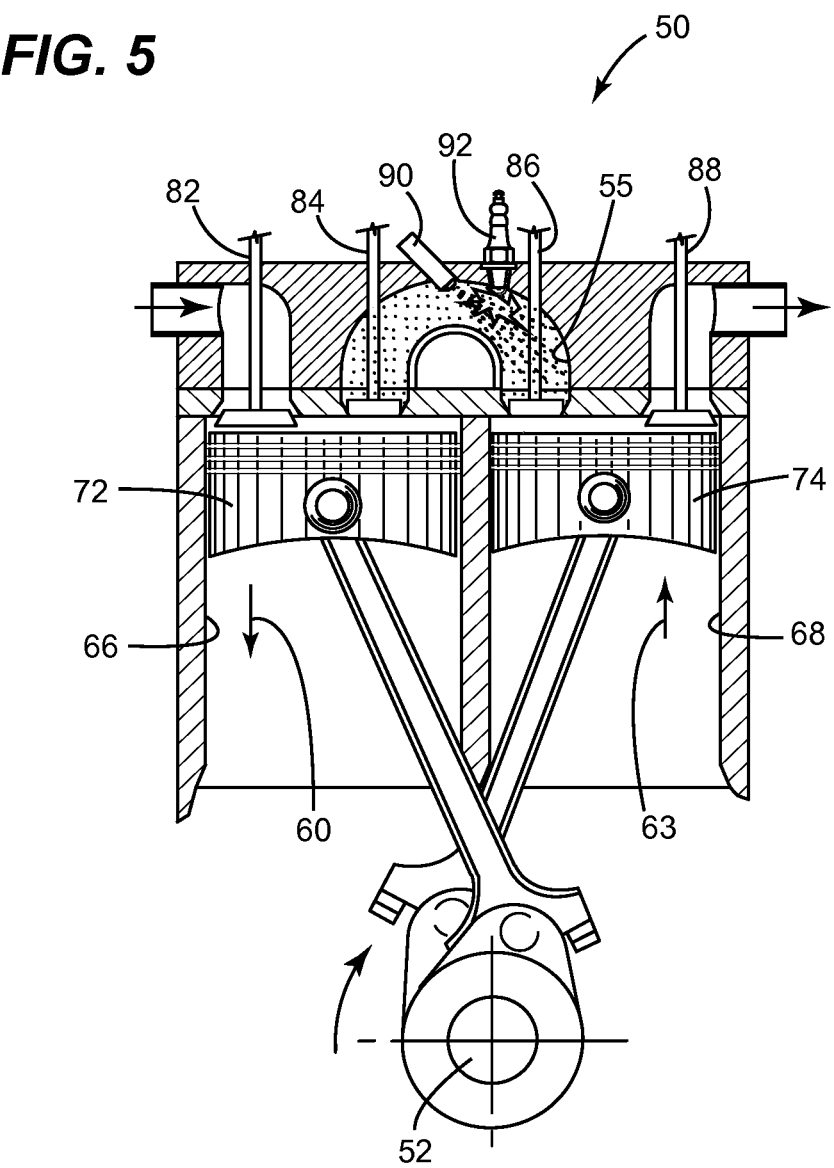
FIG. 5 is a schematic diagram of the split-cycle engine of FIG. 2 during initiation of combustion in the crossover passage.

Referring to FIG. 5, a spark plug 92 initiates combustion of the fuel in the crossover passage 55 shortly after the beginning of fuel injection. At this point, the compression piston 72 is descending toward its BDC position and the expansion piston 74 is ascending towards its TDC position. Preferably, combustion is initiated in the crossover passage 55 while the expansion piston 74 is approximately 10 to 20 degrees of rotation of the crankshaft 52 before its TDC position. As shown, combustion is initiated (and optionally completed) while the crossover compression valve 84 and the crossover expansion valve 86 are both closed. As a result, some or all of the combustion event occurs at a constant volume. The rapid pressure increase associated with such constant-volume combustion can produce significant efficiency improvements.

In alternative embodiments, the combustion event in the crossover passage 55 can be initiated by other appropriate means such as compression or microwave ignition. If compression ignition of diesel fuel is utilized, the combustion event can be initiated at substantially the same time that the fuel injection begins. In such diesel applications, the beginning of fuel injection preferably begins while the expansion piston 74 is approximately 10 to 20 degrees of rotation of the crankshaft 52 before its TDC position.

In some embodiments, the fuel injection and/or ignition described above with respect to FIGS. 4 and 5 can be performed (or can be initiated) while the crossover compression valve 84 is still open. This can allow the motion of air flowing into the crossover passage 55 from the compression cylinder 66 to assist with distribution of injected fuel within the crossover passage 55.

Figure 6:
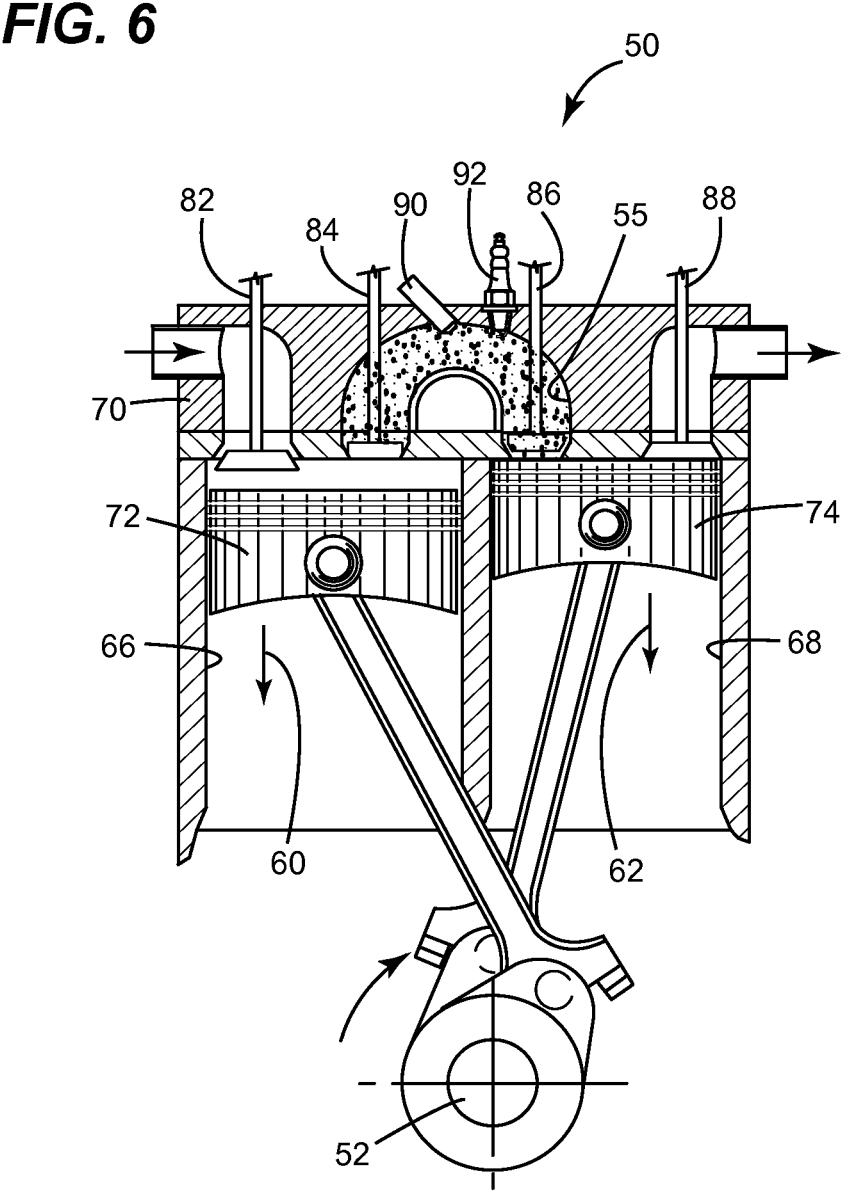
FIG. 6 is a schematic diagram of the split-cycle engine of FIG. 2 during combustion and at the beginning of an expansion stroke.

Referring to FIG. 6, the outwardly-opening crossover expansion valve 86 opens at (or close to) the same time that the expansion piston 74 reaches its TDC position in order to allow the combusting (or possibly fully combusted) air/fuel mixture, and the immense pressure associated therewith, to drive the expansion piston 74 down in an expansion (or power) stroke (represented by arrow 62). More specifically, the engine 50 is operable to open the crossover expansion valve 86 while the expansion piston 74 is within plus (+) or minus (−) 10 degrees of rotation of the crankshaft 52 from the TDC position of the expansion piston 74. The engine 50 utilizes very high expansion ratios (e.g., 40 to 1, 80 to 1, or greater). This means that, at TDC, the expansion piston 74 comes very close to the cylinder head 70 (e.g., 1.0, 0.9, 0.8, 0.7 millimeters, or less). The very high expansion ratio allows the pressure generated by the combustion event to apply as much force as possible to the expansion piston 74.

Figure 7:
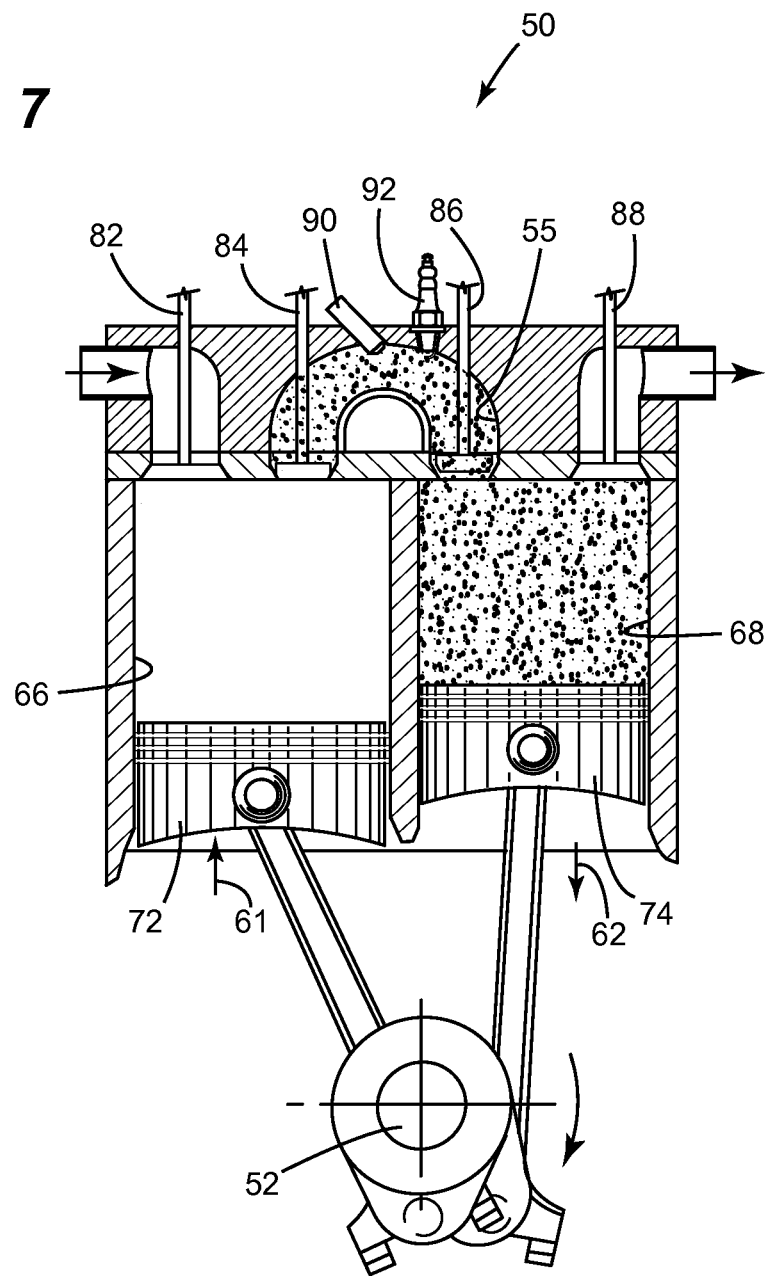
FIG. 7 is a schematic diagram of the split-cycle engine of FIG. 2 during the expansion stroke.
Figure 8:
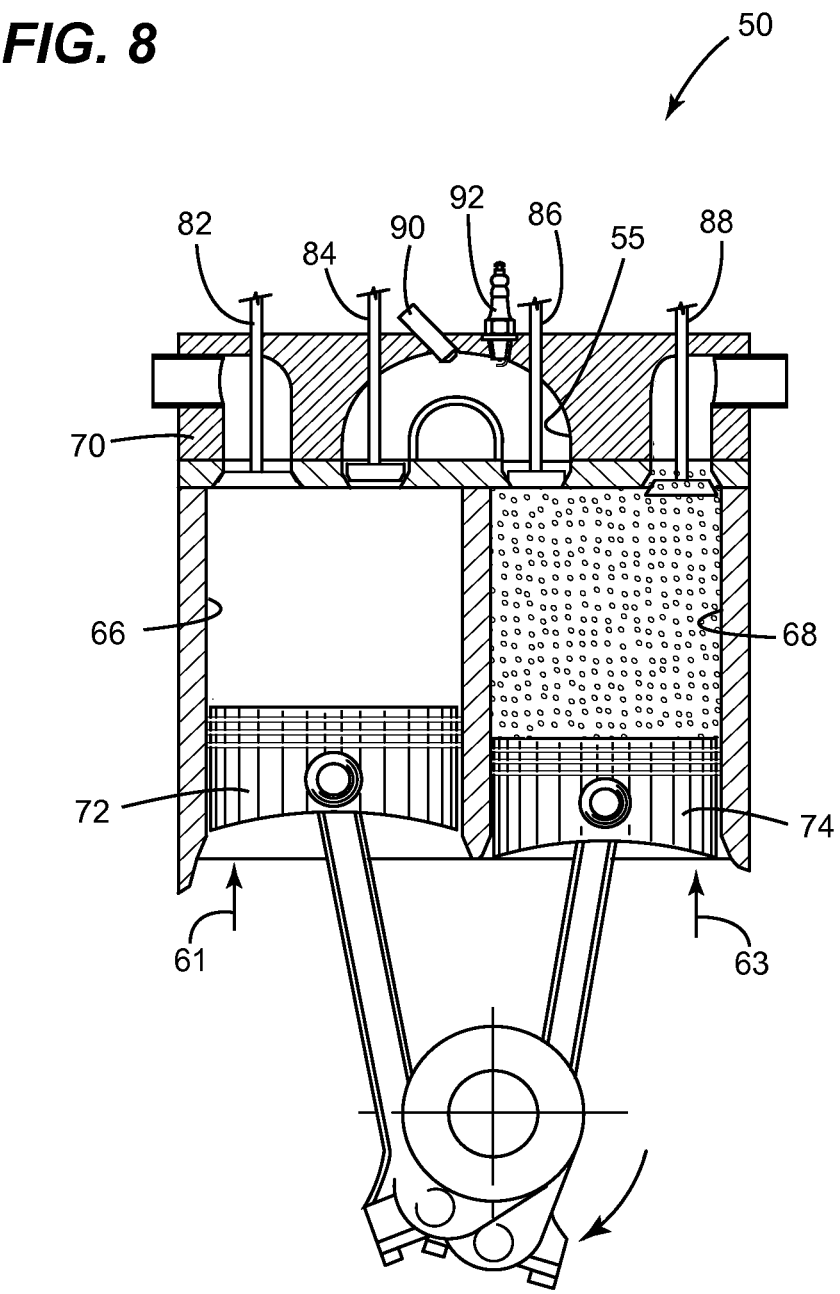
FIG. 8 is a schematic diagram of the split-cycle engine of FIG. 2 at the end of the expansion stroke and the beginning of the exhaust stroke.

Referring to FIG. 7, the pressure generated by the combustion event drives the expansion piston 74 down in the expansion stroke (represented by arrow 62), which powers the crankshaft 52. Referring to FIG. 8, when the expansion piston 74 is substantially at its BDC position, the outwardly-opening crossover expansion valve 86 closes and the inwardly-opening exhaust valve 88 opens as the expansion piston 74 begins its exhaust stroke (represented by arrow 63).

Although not shown in specific detail in FIG. 8 (for ease of illustration), some of the products of the combustion event can be trapped in the crossover passage 55 between cycles. These products of combustion can be substantially scavenged out of the crossover passage 55 in subsequent cycles.

Figure 9:
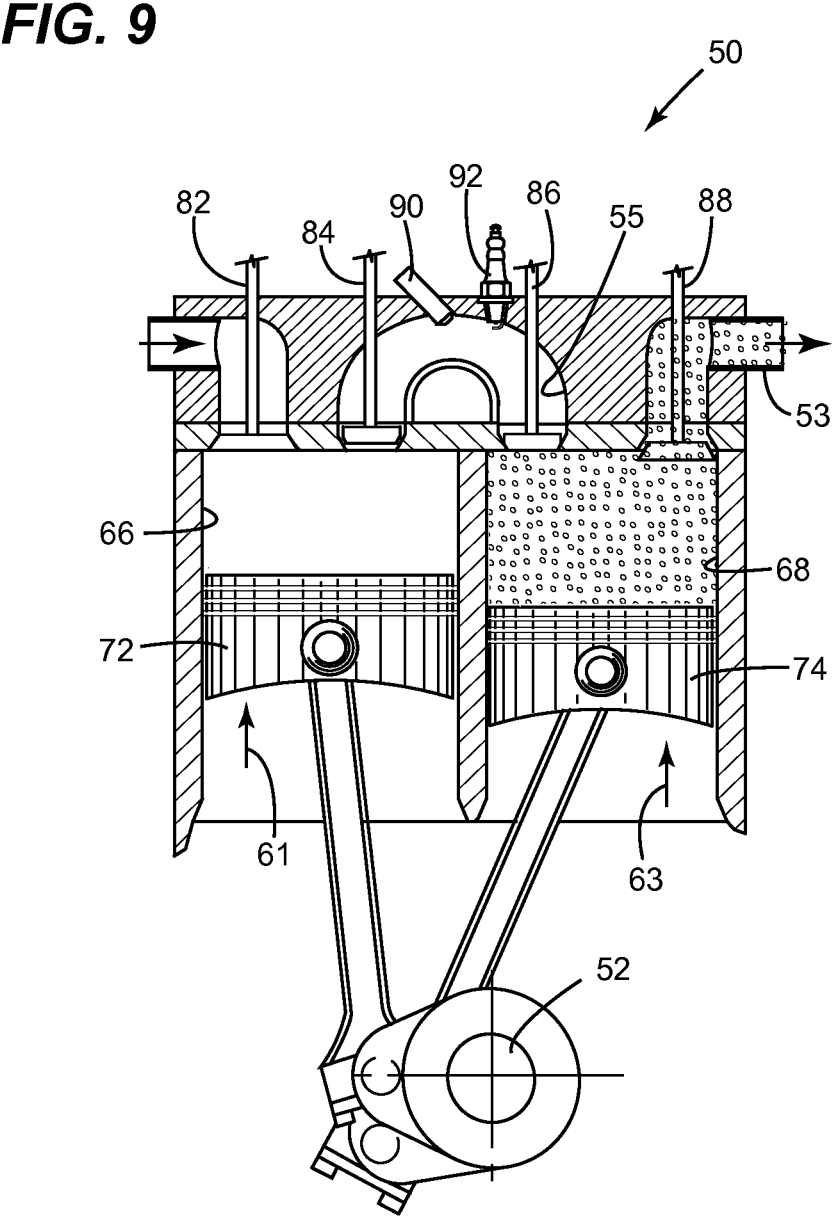
FIG. 9 is a schematic diagram of the split-cycle engine of FIG. 2 during the exhaust stroke.

Referring lastly to FIG. 9, the expansion piston ascends upward in the exhaust stroke (represented by arrow 63), which forces the products of combustion out through the exhaust port 53. At this point, the engine cycle is completed and the process repeats for subsequent cycles.

As shown in FIGS. 2-9, the engine 50 is configured such that the compression piston 72 leads the expansion piston 74. In other words, during each cycle of the engine, the compression piston 72 reaches TDC before the expansion piston 74 reaches TDC. This is in direct contrast to prior art split-cycle engines of the type shown in FIG. 1, in which the expansion piston 120 leads the compression piston 110 (i.e., the expansion piston 120 reaches TDC before the compression piston 110 reaches TDC, usually by about 20 degrees CA).

As used herein, the "phase shift angle" of a split-cycle engine refers to the number of degrees the crankshaft must rotate after the compression piston of the split-cycle engine reaches its TDC position in order for the expansion piston of the split-cycle engine to reach its TDC position.

The phase shift angle of the engine 50 is preferably greater than 0 and less than 90 degrees. The phase shift angle is more preferably between 5 and 60 degrees, even more preferably between 10 and 35 degrees, and most preferably between 20 and 25 degrees.

When the compression piston 72 leads the expansion piston 74, (1) air can be compressed into the crossover passage 55, (2) the crossover compression and crossover expansion valves 84, 86 can be closed, and (3) ignition can be initiated, all prior to the expansion piston 74 reaching its TDC position. As a result, a substantial amount of the combustion event, and possibly the entirety of the combustion event, can occur in the crossover passage 55 at a constant volume. The crossover expansion valve 86 can then be opened when the expansion piston 74 is substantially at TDC, so that the pressure of the combustion event can apply a maximum amount of force to the expansion piston 74. It will be appreciated that, in some embodiments, additional combustion can occur in expansion cylinder 68 after the crossover expansion valve 86 is opened. In other words, the combustion process can be initiated in the crossover passage 55 and then allowed to continue in the expansion cylinder 68 once the crossover expansion valve 86 is opened.

Because the engine 50 uses the crossover passage 55 as a combustion chamber, it can be particularly beneficial to minimize the volume of the crossover passage 55. Alternative embodiments of the present invention can also utilize two or more crossover passages 55 to interconnect the compression cylinder 66 and the expansion cylinder 68.

Initiating combustion in the crossover passage can also provide benefits in diesel-powered split-cycle engines. As noted above, prior art split-cycle engines of the type shown in FIG. 1 generally inject gasoline into the crossover passage and then transfer the air/fuel mixture to the expansion cylinder under pressure to promote even fuel distribution within the combustion chamber. Diesel fuel, on the other hand, has a tendency to pre-combust too quickly when injected into the high pressure environment of the crossover passage. As a result, in these prior art split-cycle engines, the fuel injector must typically be placed in the expansion cylinder in order to support diesel operation.

Placing the diesel fuel injector within the expansion cylinder carries its own difficulties, however, such as packaging concerns raised by the low clearance space between the top of the expansion piston when it is at TDC and the bottom of the cylinder head or fire deck. In addition, without the benefit of post-injection pressurized flow from the crossover passage, the diesel fuel injected directly into the expansion cylinder is not well-distributed within the combustion chamber, and can end up wetting the cylinder walls and piston face, undesirably reducing efficiency and performance.

Many of these issues can be eliminated by allowing the diesel fuel to combust in the crossover passage with the crossover valves closed, as described above with respect to FIGS. 2-9. Such combustion allows packaging of the fuel injector in the crossover passage instead of in the clearance-space-constrained expansion cylinder. In addition, the constant-volume combustion helps ensure an evenly distributed burn, while the ability to control the crossover expansion valve opening timing allows optimization of the timing at which the combustion force is applied to the expansion piston, and thus reduces pre-combustion concerns.

Figure 10:
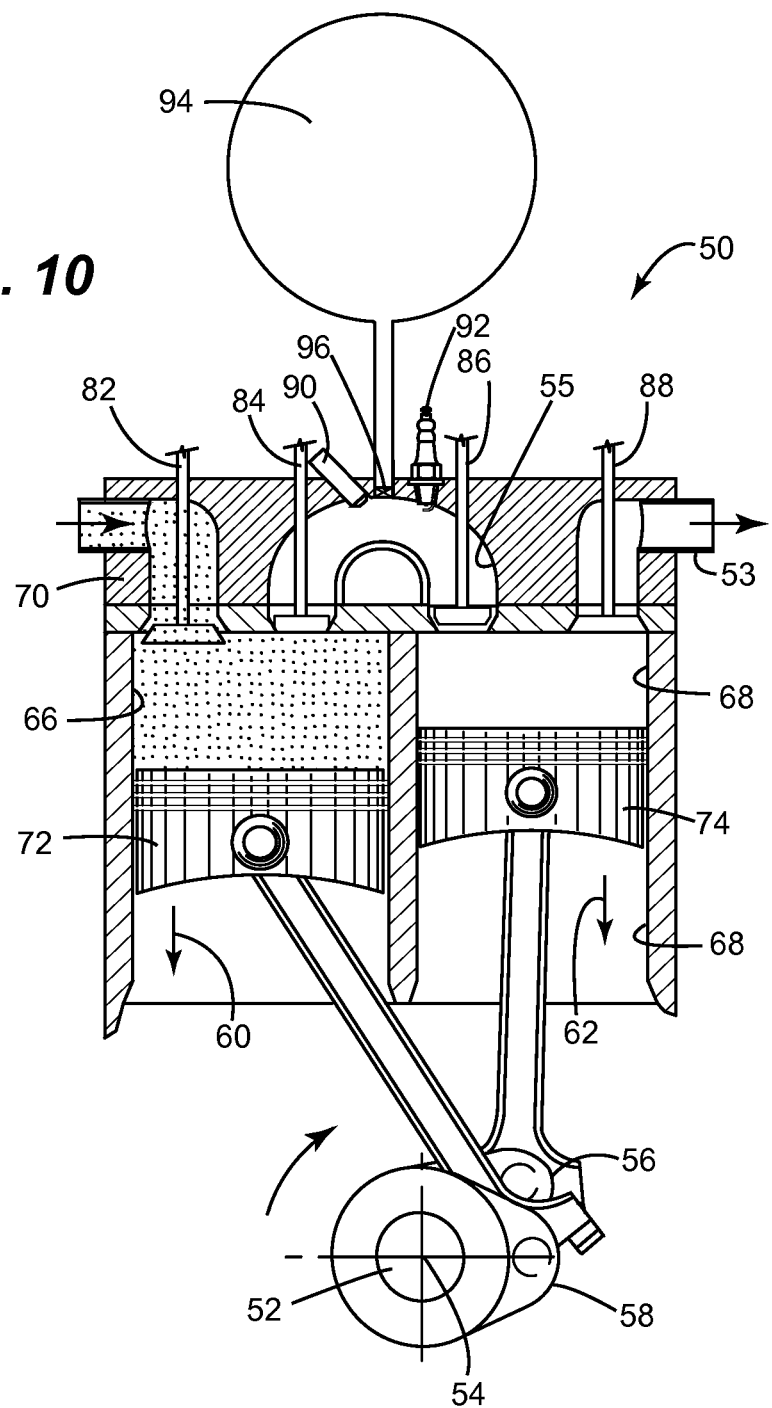
FIG. 10 is a schematic diagram of an exemplary embodiment of an air hybrid split-cycle four stroke internal combustion engine in accordance with the present invention.

Crossover passage combustion and its associated benefits can also be achieved with air hybrid split-cycle engines. For example, the engine 50 of FIGS. 2-9, which utilizes crossover passage combustion, can be modified to include an air hybrid system such as the one depicted in FIG. 1. In particular, as shown in FIG. 10, the engine 50 can be modified to include an air tank 94 that is operatively coupled to the crossover passage 55 by a tank valve 96. The tank valve can be controlled to selectively place the crossover passage 55 in fluid communication with the air tank 94. Preferably, the tank valve 96 is inwardly-opening (e.g., opening by moving into the crossover passage 55) such that its valve seat provides a positive mechanical stop to prevent the tank valve 96 from opening under the high pressures generated during a combustion event within the crossover passage 55. In use, the air tank 94 is utilized to store energy in the form of compressed air and to later supply that compressed air to power the crankshaft 52.

In EF mode, the tank valve 96 remains closed to isolate the air tank 94 from the engine 50, and the engine 50 functions normally as described above with respect to FIGS. 2-9.

In AE mode, fuel injection and combustion are disabled, and compressed air stored in the air tank 94 is supplied to the expansion cylinder 68 to drive the expansion piston 74 during the power stroke.

In one exemplary embodiment, the intake valve 82 is held open and the crossover compression valve 84 is held closed to idle the compression cylinder 66. The tank valve 96 is also held open to place the air tank 94 in fluid communication with the crossover passage 55. During each engine cycle, the crossover expansion valve 86 is opened just prior to and/or during the expansion stroke to supply compressed air from the combined volume of the air tank 94 and the crossover passage 55 to the expansion cylinder 68 and thereby exert a rotating force on the crankshaft 52. The crossover expansion valve 86 is closed once the desired amount of air is supplied to the expansion cylinder 68. The exhaust valve 88 is opened during the exhaust stroke such that the expansion piston 74 does not have to recompress the air in the expansion cylinder 68 as it ascends towards its TDC position for the next engine cycle. The cycle then repeats.

In AC mode, fuel injection and combustion are disabled, and air that is compressed in the compression cylinder 66 is supplied to the air tank 94 for storage.

In one exemplary embodiment, the intake valve 82 is opened and air is drawn into the compression cylinder 66 during the intake stroke. As the compression piston 72 ascends during the compression stroke, the crossover compression valve 84 and the tank valve 96 are opened while the crossover expansion valve 86 and the intake valve 82 are held closed such that the compression piston 72 compresses air into the air tank 94. The crossover expansion valve 86 remains closed and the exhaust valve 88 is held open during this time and during the expansion and exhaust strokes to idle the expansion cylinder 68. The cycle is then repeated.

In AEF mode, compressed air that was previously stored in the air tank 94 is used with combustion to drive the expansion piston 74.

In one exemplary embodiment, the intake valve 82 is held open and the crossover compression valve 84 is held closed to idle the compression cylinder 66. With the crossover expansion valve 86 closed, the air tank valve 96 is opened briefly to pressurize the crossover passage 55 with air stored in the air tank 94. The air tank valve 96 is then closed to isolate the air tank 94 from the forthcoming combustion event. With the crossover compression valve 84, the crossover expansion valve 86, and the air tank valve 96 all closed, fuel is added to the compressed charge in the crossover passage 55 and ignited (e.g., by a spark plug or by compression ignition) to initiate constant-volume combustion within the crossover passage 55. The crossover expansion valve 86 is then opened to transfer the combustion pressure to the expansion cylinder 68 during the expansion stroke, which is effective to drive the expansion piston 74 downward to impart rotational force to the crankshaft 52. The crossover expansion valve 86 is then closed and the exhaust valve 88 is opened during the exhaust stroke such that combustion products disposed within the expansion cylinder 68 are evacuated through the exhaust port 53, after which the cycle repeats.

In FC mode, air compressed in the compression cylinder 66 is used both to charge the air tank 94 and to support combustion. In prior art split-cycle air hybrid engines of the type illustrated in FIG. 1, in which combustion occurs only in the expansion cylinder, the air tank is usually charged after combustion occurs when operating in FC mode. In embodiments in which combustion occurs in the crossover passage, on the other hand, the ordering of these steps can be reversed. In other words, the air tank 94 is filled first, and then combustion occurs thereafter.

In one exemplary embodiment, the intake valve 82 is opened and the crossover compression valve 84 is closed during an intake stroke. During the subsequent compression stroke, the intake valve 82 and the crossover expansion valve 86 are held closed, while the crossover compression valve 84 and the air tank valve 96 are opened. This allows the compression piston 72 to compress the intake air charge into the crossover passage 55 and the air tank 94. With the crossover expansion valve 86 still in the closed position, the crossover compression valve 84 and the air tank valve 96 are then closed to seal the crossover passage 55. It will be appreciated that the timing of these valve closures can be controlled to meter the amount of air remaining in the crossover passage 55. In other words, the valve timing can be controlled to regulate the percentage of the compression charge that is added to the tank versus the percentage of the compression charge that remains in the crossover passage 55 to support combustion. Fuel is then added to this remaining air mass and combustion is initiated in the crossover passage 55 with the crossover compression valve 84, the crossover expansion valve 86, and the tank valve 96 closed to achieve constant-volume combustion. During such combustion, or after such combustion is completed, the crossover expansion valve 86 is opened to supply the pressure generated by combustion to the expansion cylinder 68, thereby forcing the expansion piston 74 downwards in a power stroke. The crossover expansion valve 86 can then be closed and the exhaust valve 88 opened during an exhaust stroke to evacuate the combustion products from the expansion cylinder 68, at which time the cycle repeats.

It will thus be appreciated that the concepts disclosed herein have application in both non-hybrid split-cycle engines and in air hybrid split-cycle engines.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An engine, comprising:
   a crankshaft rotatable about a crankshaft axis;
   a compression piston slidably received within a compression cylinder and operatively connected to the crankshaft such that the compression piston is operable to reciprocate through an intake stroke and a compression stroke of a four stroke cycle during a single rotation of the crankshaft;
   an expansion piston slidably received within an expansion cylinder and operatively connected to the crankshaft such that the expansion piston is operable to reciprocate through an expansion stroke and an exhaust stroke of said four stroke cycle during a single rotation of the crankshaft;
   a crossover passage interconnecting the compression cylinder and the expansion cylinder;
   a crossover compression valve operable to control fluid communication between the compression cylinder and the crossover passage; and
   a crossover expansion valve operable to control fluid communication between the crossover passage and the expansion cylinder,
   wherein the engine is operable to:
   initiate a combustion event in the crossover passage while the crossover compression valve and the crossover expansion valve are closed such that the crossover passage defines a closed, constant volume when the combustion event is initiated;
   initiate the combustion event 10-20 crank angle degrees before the expansion piston reaches top dead center; and
   open the crossover expansion valve after initiating the combustion event between about 10 crank angle degrees before the expansion piston reaches top dead center about 10 crank angle degrees after the expansion piston reaches top dead center; and
   wherein a phase shift angle defined as the number of degrees the crankshaft must rotate after the compression piston reaches its top dead center position in order for the expansion piston to reach its top dead center position is greater than approximately 5 degrees and less than approximately 90 degrees.

2. The engine of claim 1, wherein the phase shift angle is greater than approximately 5 degrees and less than approximately 60 degrees.

3. The engine of claim 1, wherein the phase shift angle is greater than approximately 10 degrees and less than approximately 35 degrees.

4. The engine of claim 1, wherein a ratio of a volume in the expansion cylinder when the expansion piston is at its bottom dead center position to a volume in the expansion cylinder when the expansion piston is at its top dead center position is approximately 40 to 1 or greater.

5. The engine of claim 1, wherein a ratio of a volume in the compression cylinder when the compression piston is at its bottom dead center position to a volume in the compression cylinder when the compression piston is at its top dead center position is approximately 40 to 1 or greater.

6. The engine of claim 1, wherein the crossover compression valve is operable to open outwardly away from an interior of the compression cylinder.

7. The engine of claim 1, wherein the crossover expansion valve is operable to open outwardly away from an interior of the expansion cylinder.

8. The engine of claim 1, wherein the engine is operable to initiate said combustion event while the compression piston is descending from its top dead center position towards its bottom dead center position.

9. The engine of claim 1, further comprising a fuel injection system operable to add fuel to the crossover passage.

10. The engine of claim 1, wherein the engine is operable to initiate said combustion event via compression ignition.

11. The engine of claim 1, further comprising a spark plug at least partially disposed in the crossover passage and operable to initiate said combustion event.

12. The engine of claim 1, further comprising an air tank operatively coupled to the crossover passage and a tank valve configured to selectively place the air tank in fluid communication with the crossover passage.

13. A method of operating an engine, comprising:
   supplying air compressed by a compression piston of the engine to a crossover passage;
   after said supplying, transitioning the crossover passage to a closed, constant-volume configuration;
   after said transitioning, adding fuel to the crossover passage and initiating combustion of an air-fuel mixture disposed within the crossover passage, wherein said combustion is initiated 10-20 crank angle degrees before an expansion piston reaches top dead center; and
   after said initiating, opening a crossover expansion valve between about 10 crank angle degrees before the expansion piston reaches top dead center and about 10 crank angle degrees after the expansion piston reaches top dead center to transfer pressure generated during combustion to an expansion cylinder to exert force on the expansion piston and drive a crankshaft;
   wherein said initiating is performed after the compression piston reaches top dead center.

14. The method of claim 13, wherein said transitioning comprises closing a crossover compression valve and closing a crossover expansion valve.

15. The method of claim 14, wherein said transitioning comprises closing an air tank valve.

16. The method of claim 13, wherein said supplying comprises transferring the air compressed by the compression piston from an air tank to the crossover passage.

17. The method of claim 13, wherein the pressure generated during combustion is transferred to the expansion cylinder before combustion is completed.

* * * * *